(12) United States Patent
Schwarz et al.

(10) Patent No.: US 8,246,925 B2
(45) Date of Patent: Aug. 21, 2012

(54) PROCESSING OF CHLOROSILANE FLOWS CONTAINING BORON

(75) Inventors: Christoph Schwarz, Marl (DE); Dorothea Schwarz, Marl (DE); Hartwig Rauleder, Rheinfelden (DE); Ingo Pauli, Schmitten (DE); Andreas Nelte, Oer-Erkenschwick (DE); Harald Seiler, Mainz (DE)

(73) Assignee: Evonik Degussa GmbH, Essen (DE)

( * ) Notice: Subject to any disclaimer, the term of this patent is extended or adjusted under 35 U.S.C. 154(b) by 273 days.

(21) Appl. No.: 12/528,087

(22) PCT Filed: Jan. 22, 2008

(86) PCT No.: PCT/EP2008/050682
§ 371 (c)(1),
(2), (4) Date: Aug. 21, 2009

(87) PCT Pub. No.: WO2008/113619
PCT Pub. Date: Sep. 25, 2008

(65) Prior Publication Data
US 2010/0320072 A1    Dec. 23, 2010

(30) Foreign Application Priority Data
Mar. 21, 2007   (DE) .......................... 10 2007 014 107

(51) Int. Cl.
*C01B 33/08* (2006.01)
(52) U.S. Cl. ........................................................ 423/342
(58) Field of Classification Search ........... 203/DIG. 19, 203/81, 91; 423/342
See application file for complete search history.

(56) References Cited

U.S. PATENT DOCUMENTS

| | | | | |
|---|---|---|---|---|
| 3,252,752 | A | * | 5/1966 | Franz et al. .................... 423/342 |
| 4,112,057 | A | * | 9/1978 | Lang et al. ..................... 423/342 |
| 4,713,230 | A | | 12/1987 | Doornbos |
| 4,923,687 | A | | 5/1990 | Schork et al. |
| 5,026,533 | A | * | 6/1991 | Matthes et al. ................ 423/342 |
| 5,616,755 | A | | 4/1997 | Seiler et al. |
| 5,654,459 | A | | 8/1997 | Kropfgans et al. |
| 5,698,726 | A | | 12/1997 | Rauleder et al. |
| 5,852,206 | A | | 12/1998 | Horn et al. |
| 6,100,418 | A | | 8/2000 | Standke et al. |
| 6,142,024 | A | | 11/2000 | Rauleder et al. |
| 6,150,551 | A | | 11/2000 | Kropfgans et al. |
| 6,177,584 | B1 | | 1/2001 | Loewenberg et al. |
| 6,222,056 | B1 | | 4/2001 | Bade et al. |

(Continued)

FOREIGN PATENT DOCUMENTS
JP         01-226712    *    9/1989
(Continued)

OTHER PUBLICATIONS

Van Winkle, M. "Distillaiton", p. 198 and 288,Yaws, McGraw-Hill (c)1967.*

(Continued)

*Primary Examiner* — Robert A Hopkins
(74) *Attorney, Agent, or Firm* — Oblon, Spivak, McClelland, Maier & Neustadt, L.L.P.

(57) ABSTRACT

The invention relates to a method for yielding boron-depleted chlorosilanes from a chlorosilane mixture containing boron by means of separation by distillation of a boron-enriched distillation flow. The invention further relate to a device for yielding boron-depleted chlorosilanes from a chlorosilane mixture containing boron.

21 Claims, 5 Drawing Sheets

U.S. PATENT DOCUMENTS

Figure 1:
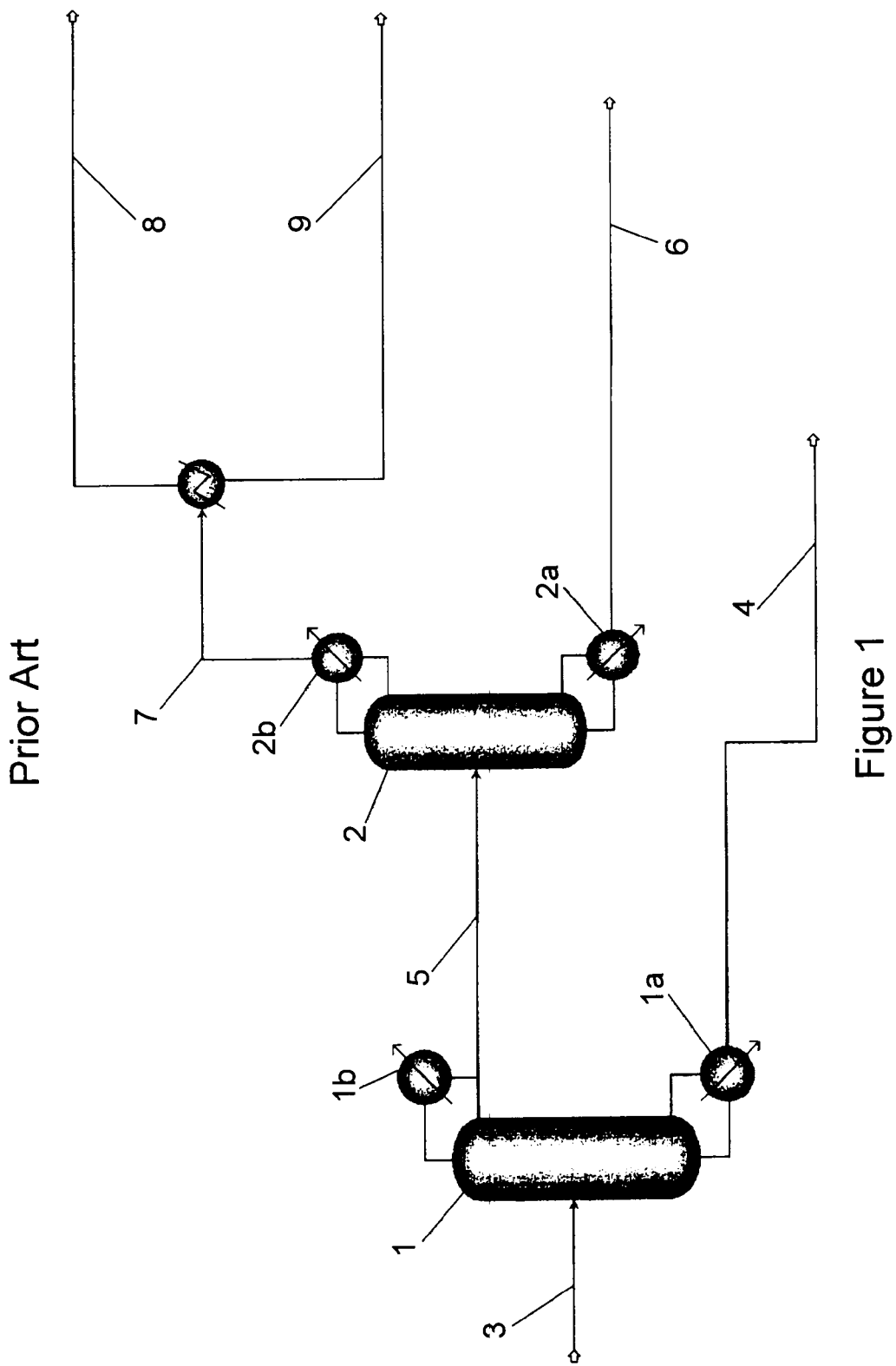

| | | | |
|---|---|---|---|
| 6,291,698 B1 | 9/2001 | Bade et al. | |
| 6,372,190 B1 | 4/2002 | Zehe et al. | |
| 6,585,941 B2 | 7/2003 | Zehe et al. | |
| 6,680,038 B2 | 1/2004 | Rauleder et al. | |
| 6,727,375 B2 | 4/2004 | Steding et al. | |
| 6,843,972 B2 * | 1/2005 | Klein et al. | 423/240 S |
| 7,204,963 B2 | 4/2007 | Rauleder et al. | |
| 7,410,914 B2 | 8/2008 | Kuehnle et al. | |
| 7,507,850 B2 | 3/2009 | Muh et al. | |
| 8,038,961 B2 | 10/2011 | Sonnenschein et al. | |
| 2004/0132272 A1 * | 7/2004 | Ku et al. | 438/585 |
| 2008/0197014 A1 | 8/2008 | Lang et al. | |
| 2008/0283972 A1 | 11/2008 | Muh et al. | |
| 2008/0289690 A1 | 11/2008 | Sonnenschein et al. | |
| 2008/0314728 A1 | 12/2008 | Ghetti | |
| 2009/0020413 A1 | 1/2009 | Popp et al. | |
| 2009/0259063 A1 | 10/2009 | Lang et al. | |
| 2010/0080746 A1 | 4/2010 | Lang et al. | |
| 2010/0296994 A1 | 11/2010 | Rauleder et al. | |

FOREIGN PATENT DOCUMENTS

| | | |
|---|---|---|
| WO | 2006 054325 | 5/2006 |

OTHER PUBLICATIONS

Yaws, K., Li, K., Chu, T.,Fang, C., Lutwack, R., Briglio,A., "New Technologies for Solar Energy Silicon-Cost Analysis of Dichlorosilane Process", Solar Energy, vol. 27, No. 6, pp. 539-546, Elsevier (c) 1981.*

Chen. J., Lin, H., Yang, M., "Spectrophotometric Determination of Trace and Ultratrace Levels of Boron in Silicon and Chlorosilane Samples", Fresenius Journal of Analytical Chemistry, vol. 340, pp. 357-362, Springer-Verlag (c) 1991.*

Simmler, W., "Silicon Compounds, Inorganics", Wiley-VCH Verlag (c) 2005.*

U.S. Appl. No. 13/059,692, filed Feb. 18, 2011, Lang, et al.
U.S. Appl. No. 13/121,756, filed Mar. 30, 2011, Lang, et al.
U.S. Appl. No. 61/110,827, filed Nov. 3, 2008, Rauleder, et al.
U.S. Appl. No. 13/121,761, filed Mar. 30, 2011, Rauleder, et al.
U.S. Appl. No. 13/121,758, filed Mar. 30, 2011, Lang, et al.
U.S. Appl. No. 61/111,127, Nov. 4, 2008, Panz.
U.S. Appl. No. 13/121,754, filed Mar. 30, 2011, Panz, et al.
U.S. Appl. No. 61/111,125, filed Nov. 4, 2008, Panz.
U.S. Appl. No. 13/121,751, filed Mar. 30, 2011, Panz, et al.
U.S. Appl. No. 61/110,828, filed Nov. 3, 2008, Rauleder, et al.
U.S. Appl. No. 13/121,759, filed Mar. 30, 2011, Rauleder, et al.
U.S. Appl. No. 61/112,891, Nov. 10, 2008, Lang, et al.
U.S. Appl. No. 13/128,442, filed May 10, 2011, Lang, et al.
U.S. Appl. No. 13/121,702, filed Mar. 30, 2011, Rauleder, et al.
U.S. Appl. No. 12/738,246, filed Jun. 9, 2010, Rauleder, et al.
U.S. Appl. No. 12/811,925, filed Jul. 7, 2010, Mueh, et al.
U.S. Appl. No. 12/738,799, filed Jul. 13, 2010, Rauleder, et al.
U.S. Appl. No. 12/812,857, filed Jul. 14, 2010, Mueh, et al.
U.S. Appl. No. 12/681,114, filed Apr. 1, 2010, Mueh, et al.
U.S. Appl. No. 12/999,240, filed Dec. 15, 2010, Seliger, et al.
U.S. Appl. No. 13/383,965, filed Jan. 13, 2012, Rauleder, et al.
U.S. Appl. No. 13/383,681, filed Jan. 12, 2012, Mueh, et al.

* cited by examiner

PROCESSING OF CHLOROSILANE FLOWS CONTAINING BORON

TECHNICAL FIELD

The present invention relates to a process for recovering boron-depleted chlorosilanes from a boron-containing chlorosilane mixture by distillatively removing a boron-enriched distillation stream. The invention further relates to an apparatus for recovering boron-depleted chlorosilanes from a boron-containing chlorosilane mixture.

BACKGROUND OF THE INVENTION

It is known that technical-grade trichlorosilane ($SiHCl_3$, TCS) and/or silicon tetrachloride ($SiCl_4$, STC) is used as a raw material in the preparation of polycrystalline silicon, which finds use, for example, in photovoltaics or in glass fiber or chip production. These products comprise various impurities, for example other silanes, for instance dichlorosilane ($SiH_2Cl_2$, DCS), but also, for example, boron compounds, especially boron-trichloride ($BCl_3$).

Boron-containing components are generally detrimental for the further use of TCS and STC, for example in the abovementioned fields of application, and therefore have to be removed or reduced to a target value. Residual amounts of $BCl_3$ in the chlorosilane as a feedstock are an obstacle, for example, to controlled doping of ultrapure silicon. Typical orders of magnitude of impurities are 0.1 to 5 ppm by weight, occasionally also up to 10 ppm by weight or higher.

The removal of trace components by a distillative route is known to be difficult in many applications. For example, the boiling points of boron trichloride (12.5° C.) and, for example, dichlorosilane (8.3° C.) are so close to one another that, in a conventional distillative workup route as shown in FIG. 1, the boron-containing impurities are removed again as so-called low boilers together with the dichlorosilane and a high proportion of trichlorosilane via the top stream of the second distillation column which is used for separation of the top stream of a first distillation column. The low boiler fraction removed in this way, which comprises the boron impurities, especially boron trichloride, is then either discarded in its entirety or is subjected to a nondistillative workup. In the nondistillative workup, for example, complexing methods as described in WO 06/054325 are used. This conventional workup route gives rise to losses of the materials of value, TCS and DCS.

It is therefore an object of the present invention to work up boron-containing chlorosilane streams by a purely distillative process, in such a way that it is possible to obtain high-purity chlorosilane fractions, it being possible to obtain especially either boron-depleted dichlorosilane, trichlorosilane and/or silicon tetrachloride, or else boron-depleted mixtures of dichlorosilane and trichlorosilane, and the loss especially of dichlorosilane and trichlorosilane through removal of boron-enriched silane fractions being reduced.

DESCRIPTION OF THE INVENTION

The stated object is achieved by a process for recovering boron-depleted chlorosilanes from a boron-containing chlorosilane mixture by distillatively removing a boron-depleted distillation stream, wherein, in the case of an arrangement of one or more distillation columns, a boron-enriched side stream is branched off at least in one distillation column. This branched-off side stream can be disposed of or sent to another use. The inventive removal of a boron-enriched side stream makes it possible to obtain boron-depleted streams of STC, DCS and TCS, which are usable in various ways without separate workup. Only the remaining boron-containing side stream has to be disposed of via disposal systems, for example washing and hydrolysis, giving rise to lower losses of DCS and/or TCS than in the conventional workup route shown in FIG. 1.

An alternative embodiment of the present invention envisages, for recovery of boron-depleted trichlorosilane from a boron-containing chlorosilane mixture, a process wherein, in an arrangement of only one distillation column, a boron-depleted side stream of trichlorosilane is branched off. This trichlorosilane can be sent to further workup or to another use. In addition, in this process, a boron-enriched top stream or side stream is branched off, which is disposed of or sent to another use. In this embodiment, the boron-depleted chlorosilane is withdrawn as a side stream, the removal of the boron-containing compounds being effected either via a further side stream or via a boron-enriched top stream (cf. FIGS. 4 and 5).

The common concept in both abovementioned processes is that boron-enriched or boron-depleted chlorosilane streams are branched off via a side stream, in order ultimately to arrive at boron-depleted chlorosilanes, specifically boron-depleted dichlorosilane, trichlorosilane and/or silicon tetrachloride, or else boron-depleted mixtures of dichlorosilane and trichlorosilane.

Figure 2:
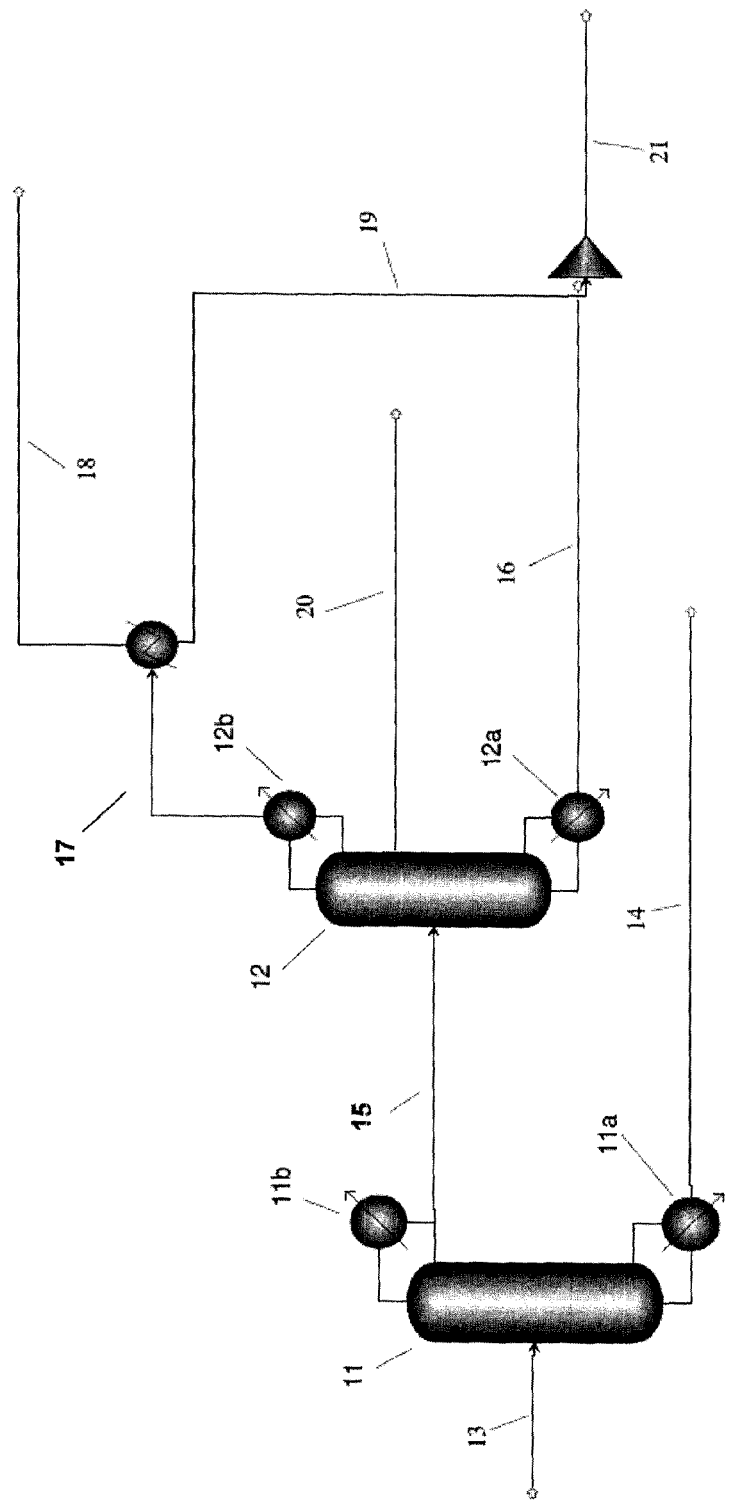
Figure 3:
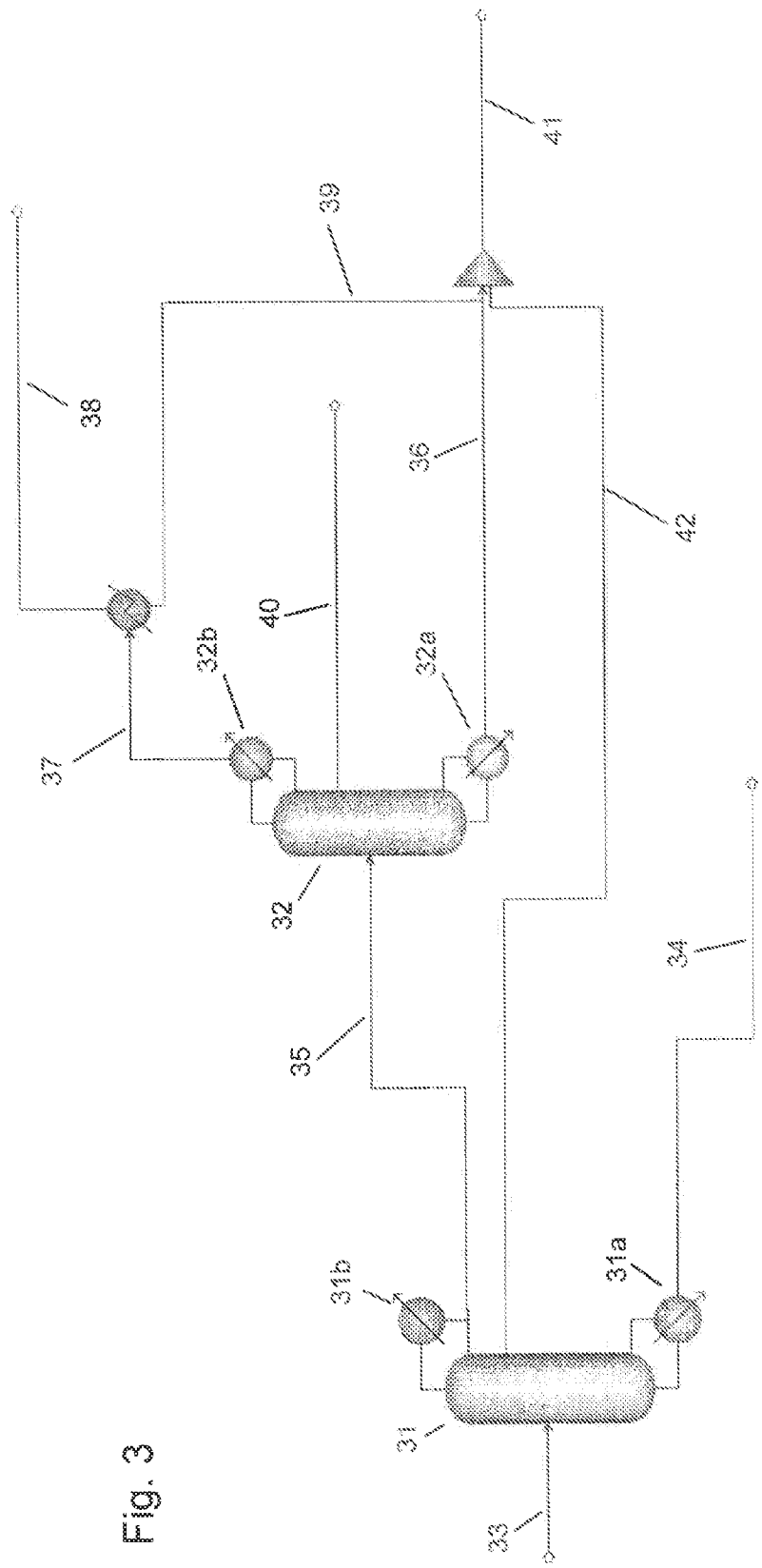
Figure 4:
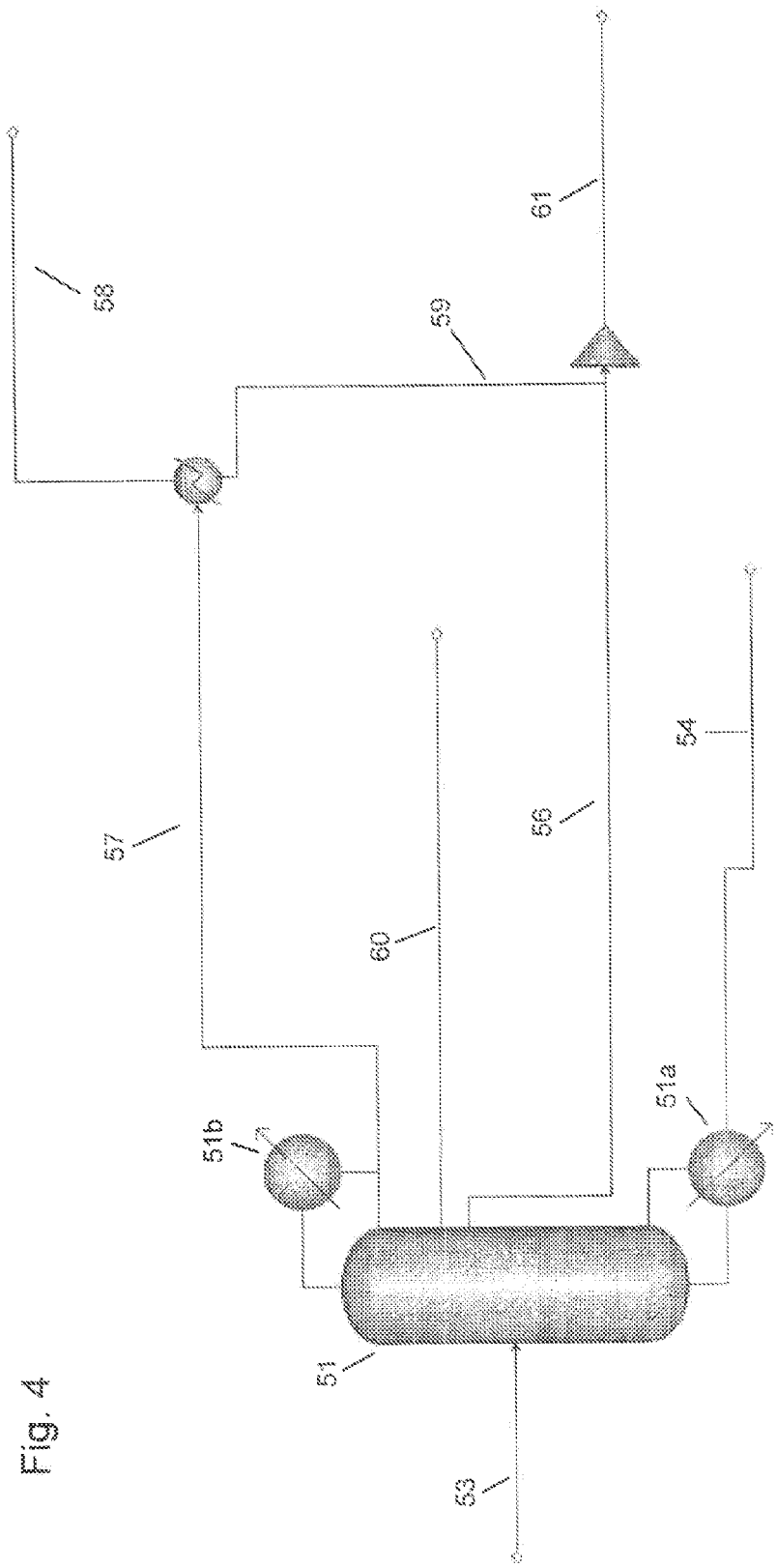

In a preferred embodiment of the invention, in both of the above processes, a boron-depleted bottom stream of tetrachlorosilane is branched off in one distillation column or in the lowermost distillation column, and is sent to further workup or to another use (cf. FIGS. 2, 3 and 4).

In an arrangement of a plurality of distillation columns, the "lowermost distillation column" is understood to mean the column which works in the highest boiling temperature range of the chlorosilane mixture supplied, i.e. in which tetrachlorosilane is branched off as the bottom stream if appropriate. The "uppermost distillation column" correspondingly means the column which works in the lowest boiling temperature range, i.e. in which top stream inert gases and low boilers are removed if appropriate.

In a preferred embodiment of the invention, furthermore, a side stream or a bottom stream of boron-depleted trichlorosilane is branched off in one distillation column or in at least one of the distillation columns, and is sent to further workup or to another use (cf. FIGS. 2 and 4).

In a particular embodiment of the invention, in the case of a plurality of distillation columns, a bottom stream of boron-depleted trichlorosilane is branched off in one of these distillation columns which is not the lowermost (cf. FIG. 2).

In another particular embodiment of the invention, in the case of a plurality of distillation columns, a side stream is branched off in one of these distillation columns, and a bottom stream of boron-depleted trichlorosilane is branched off in a further distillation column above the aforementioned distillation column, in which case the two boron-depleted trichlorosilane streams can optionally be combined (cf. FIG. 3). The description "above the aforementioned distillation column" means the distillation column in which, compared to the distillation column below, the higher-boiling fractions are separated.

In the process according to the invention, moreover, a top stream of boron-depleted dichlorosilane may be branched off in the distillation column or, in the case of a plurality of distillation columns, in at least one of the distillation columns which is not the lowermost and optionally combined with the boron-depleted trichlorosilane stream(s) (cf. FIGS. 2, 3 and 4) or sent to another use.

In the process according to the invention, inert gases may preferably additionally be removed from the top stream of the distillation column or of the uppermost distillation column. "Inert gases" shall be understood here to mean dissolved gases which cannot be precipitated with cooling water or customary coolant mixtures, for example $N_2$, $H_2$ and/or HCl.

In the process according to the invention, the distillation is, or the distillations are, performed at a pressure in the range between 0.5 and 22 bar, preferably between 1 and 10 bar, more preferably between 1.5 and 5 bar, the particular pressures in the individual columns among a plurality of distillation columns being selectable independently of one another. The pressures in the particular columns, within the pressure ranges specified, are also guided by economic aspects, and the selection of the operating media, for example for the condensation, for example cooling water at ambient temperature, or for the evaporation, for example steam at a low pressure level, e.g. 4 bar, may play a role. The distillation columns are preferably equipped with a condensation system (condenser) to generate the reflux to the particular column and one or more evaporators for adjusting the bottom temperatures. The columns are equipped with distillation packings, random packings, distillation trays or the like, which determine the separating performance and the pressure drop over the column. The distillations are performed preferably in the temperature range from −20° C. to 200° C., further preferably from 0° C. to 160° C. and especially preferably from 20° C. to 140° C. The lower temperature in each case relates to the condensation temperature of the main condenser, i.e. of the condenser which condenses the majority of the column vapor. In general, this is the first condenser in the condensation pathway. The separating performance of the columns is determined essentially by the separating performance needed for the separation of the main components, STC, TCS and DCS. The columns used are 10 to 120 plates, preferably 20 to 90 theoretical plates, more preferably 30 to 80 or fewer theoretical plates.

In a preferred embodiment of the process according to the invention, the boron-containing chlorosilane mixture fed to the distillative workup contains in each case preferably 2 to 98% by weight, more preferably 40 to 95% by weight, especially preferably 70 to 90% by weight of tetrachlorosilane; 1 to 97% by weight, more preferably 5 to 50% by weight, especially preferably 10 to 30% by weight, of trichlorosilane; 0.01 to 20% by weight, more preferably 0.05 to 5% by weight, especially preferably 0.075 to 1% by weight of dichlorosilane, and 0.1 to 20 ppm by weight of $BCl_3$, more preferably 0.5 to 5 ppm by weight. The mass flow supplied may be 1000 to 800 000 kg/h.

In a preferred embodiment of the process according to the invention, the boron-enriched side stream which has been branched off and is preferably disposed of contains at least 20%, preferably at least 50%, especially preferably more than 80%, of the amount of $BCl_3$ present in the boron-containing chlorosilane mixture sent to the distillative workup (distillation input feed). The content of $BCl_3$ in the boron-enriched side stream, compared to the content of $BCl_3$ in the top stream of the uppermost column, which thus contains the inert gases and low boilers among other substances, is enriched by a factor of 1.5, preferably by a factor of 2.5, more preferably by a factor of 5 or higher. Typical $BCl_3$ contents are 100 ppm by weight to 2% by weight, preferably 250 to 8000 ppm by weight. The mass flow branched off may be 1 to 100 kg/h.

In a further preferred embodiment of the process according to the invention, the boron-depleted side stream or bottom stream or the boron-depleted side streams and bottom streams of trichlorosilane, contain more than 90% by weight, preferably more than 99% by weight, and more preferably high-purity trichlorosilane, the proportion of $BCl_3$ being lower than the proportion in the boron-containing chlorosilane mixture supplied (distillation input feed). The mass flow removed or at least one of the mass flows removed may be 1000 to 50 000 kg/h.

In yet a further preferred embodiment of the process according to the invention, the boron-depleted top stream contains low boilers, principally dichlorosilane, and inert gases, and not more than 60%, preferably not more than 50%, more preferably not more than 30%, of the $BCl_3$ which was present in the boron-containing chlorosilane mixture supplied (distillation input feed). The mass flow thus removed may be 10 to 1000 kg/h.

In a particular embodiment of the process according to the invention, the combined boron-depleted stream of trichlorosilane and dichlorosilane contains principally trichlorosilane and dichlorosilane, the proportion of $BCl_3$ being lower than the proportion in the boron-containing chlorosilane mixture supplied (distillation input feed). The combined and removed mass flow may be 1000 to 50 000 kg/h.

The present invention further provides an apparatus for recovering boron-depleted chlorosilanes from a boron-containing chlorosilane mixture, comprising:
a) one or more distillation columns suitable for distillation of boron-containing chlorosilane mixtures,
b) means of supplying a boron-containing chlorosilane mixture, said means being arranged on the distillation column or on the lowermost distillation column and being suitable for supplying a mass flow, preferably of 1000 to 800 000 kg/h,
c) means of removing a boron-depleted bottom stream of tetrachlorosilane, said means being arranged on the distillation column or on the lowermost distillation column and being suitable for removing a mass flow, preferably of 500 to 750 000 kg/h,
d) means of removing a boron-depleted side stream or bottom stream of trichlorosilane, said means being arranged on at least one of the distillation columns and being suitable for removing a mass flow, preferably of 1000 to 50 000 kg/h,
e) means of removing a boron-depleted top stream of low boilers, principally dichlorosilane, said means being arranged on at least one of these distillation columns which is not the lowermost and being suitable for removing a mass flow, preferably of 10 to 1000 kg/h,
f) means of removing inert gases from the top stream of the distillation column or, in the case of a plurality of distillation columns, from the uppermost distillation column, and
g) optionally, means of combining the boron-depleted low boilers, principally dichlorosilane, from the top stream with the boron-depleted trichlorosilane stream(s) removed beforehand, and means of removing the combined chlorosilane streams, the latter being suitable for removing a mass flow, preferably of 1000 to 50 000 kg/h,
wherein a means of removing a boron-enriched side stream is arranged at least in one of the distillation columns and the means is suitable for removing a mass flow, preferably of 1 to 100 kg/h. Examples of different embodiments of the above-described apparatus are shown in FIGS. 2 to 4.

Figure 5:
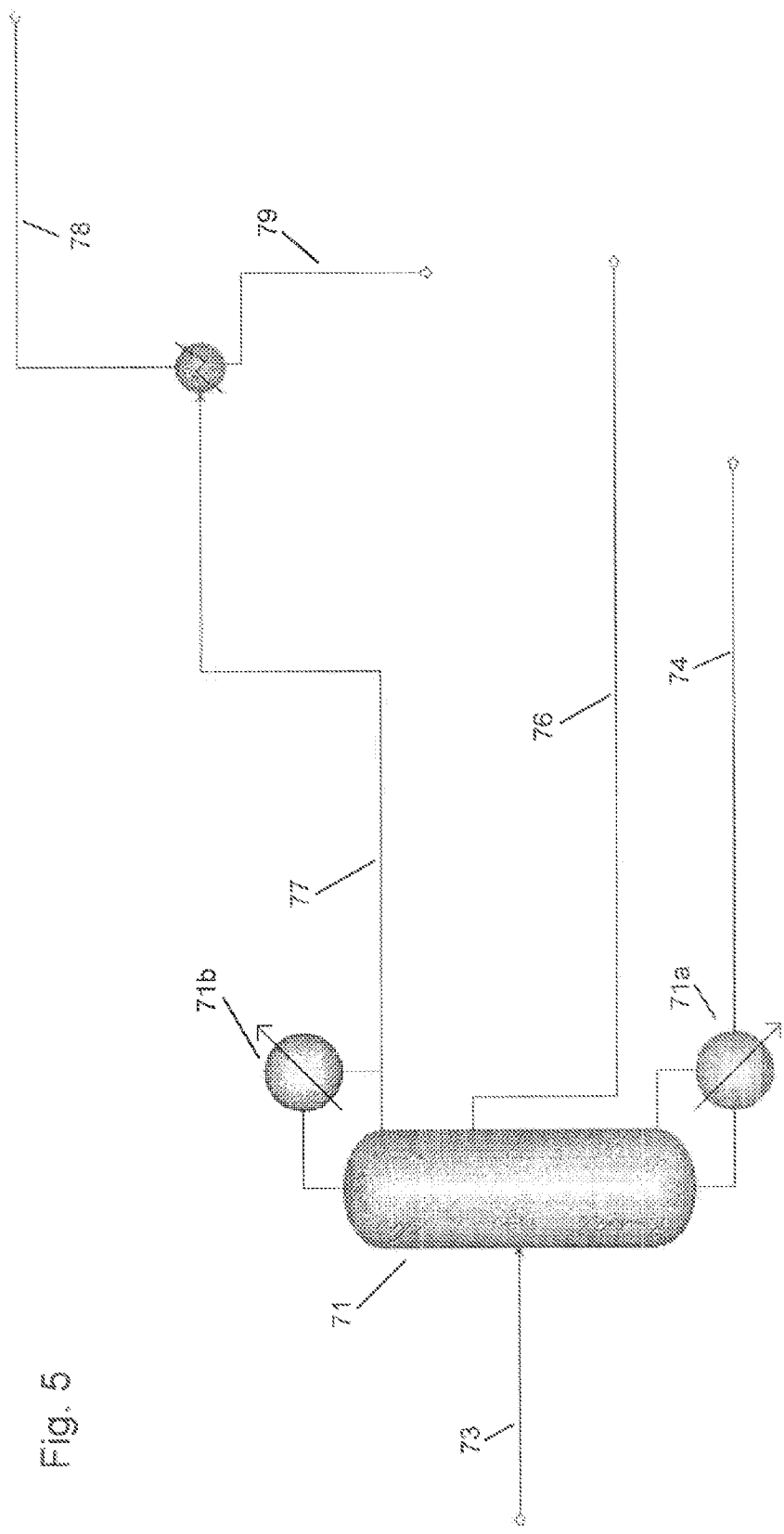

An alternative embodiment of the invention provides an apparatus for recovering boron-depleted chlorosilanes from a boron-containing chlorosilane mixture, comprising:
a) a distillation column suitable for distilling boron-containing chlorosilane mixtures, b) means, arranged on the distillation column, of supplying a boron-containing chlorosilane mixture, said means being suitable for supplying a mass flow, preferably of 1000 to 800 000 kg/h,
c) means, arranged on the distillation column, of removing a boron-depleted bottom stream of tetrachlorosilane, said means being suitable for removing a mass flow, preferably of 500 to 750 000 kg/h,
d) means, arranged on the distillation column, of removing a boron-depleted side stream of trichlorosilane, said means being suitable for removing a mass flow, preferably of 1000 to 50 000 kg/h, and
e) means of removing inert gases from the top stream of the distillation column,
wherein, for the removal of boron, means of removing a boron-enriched top stream or side stream are arranged on the distillation column and the means is suitable for removing a mass flow, preferably of 1 to 100 kg/h. Two working examples of the aforementioned alternative apparatus according to the invention are shown in FIGS. 4 and 5.

Wherever a side stream is branched off in accordance with the invention, this can also be done in a dividing wall column instead of in a simple column without dividing wall. It is thus possible to achieve a higher purity and better possible energy savings. For the TCS side stream, it is thus possible to obtain, for example, $BCl_3$ contents in the moderate to low ppb range.

EXAMPLES

Comparative Example 1

Conventional Connection

FIG. 1 shows a conventional distillation apparatus consisting of a first distillation column 1 including evaporator 1a and condenser 1b, a second distillation column 2 including evaporator 2a and condenser 2b, means 3 of supplying a boron-containing chlorosilane mixture, means 4 of removing a boron-depleted bottom stream of tetrachlorosilane, means 5 of transferring a top stream of low boilers from the first distillation column 1 to the second distillation column 2, means 6 of removing a boron-depleted bottom stream of trichlorosilane from the second distillation column 2, means 7 of removing a top stream from the second distillation column, which is separated into a stream of inert gases 8 and a low boiler fraction 9, comprising $BCl_3$, DCS and TCS, which are discarded or sent to further workup.

Table 1 shows the proportions by mass of the individual components in the particular substreams in the arrangement according to comparative example 1 and also reports the particular mass flows. The values reported are merely a specific example of the mass flows of the individual components in a "conventional connection" according to comparative example 1:

| Proportion | Mass flow in line | | |
|---|---|---|---|
| by mass | 3 | 6 | 9 |
| DCS | 0.001 | 0.001 | 0.596 |
| $BCl_3$ in ppm | 1 | 1 | 496 |
| TCS | 0.177 | 0.999 | 0.404 |
| $SiCl_4$ | 0.819 | 0 | 0 |
| Others | 0.004 | 0 | 0 |
| Mass flow kg/h | 50 000 | 8789 | 74 |

Example 2

Boron Discharge in the Side Stream of a Low Boiler Column

FIG. 2 shows a preferred embodiment of an inventive distillation arrangement comprising a first distillation column 11 including evaporator 11a and condenser 11b, a second distillation column 12 including evaporator 12a and condenser 12b, means 13 of supplying a boron-containing chlorosilane mixture, means 14 of removing a boron-depleted bottom stream of tetrachlorosilane, means 15 of transferring a top stream of low boilers from the first distillation column 11 to the second distillation column 12, means of removing a boron-depleted bottom stream of trichlorosilane, means 17 of removing a boron-depleted top stream of low boilers, from which inert gases 18 and a dichlorosilane fraction 19 are removed, and means of removing a boron-enriched side stream from the second distillation column 12, the branched-off side stream 20 serving for boron discharge. In addition, FIG. 2 shows means 21 of removing the combined dichlorosilane streams 19 and trichlorosilane streams 16.

Table 2 shows, with reference to a specific example, the proportions by mass of the individual components in the particular substreams in the arrangement according to example 2 and reports the particular mass flows:

| Proportion | Mass flow in line | | | | |
|---|---|---|---|---|---|
| by mass | 13 | 16 | 19 | 20 | 21 |
| DCS | 0.001 | 0 | 1 | 0.894 | 0.005 |
| $BCl_3$ in ppm | 1 | 1 | 247 | 5200 | 2 |
| TCS | 0.177 | 1 | 0 | 0.1 | 0.995 |
| $SiCl_4$ | 0.819 | 0 | 0 | 0 | 0 |
| Others | 0.004 | 0 | 0 | 0 | 0 |
| Mass flow kg/h | 50 000 | 8808 | 48 | 7 | 8856 |

Example 3

TCS Preparation as a Side Stream with More Efficient Discharge of Boron in the Side Stream of a Low Boiler Column FIG. 3 shows a further preferred embodiment of an inventive distillation arrangement comprising a first distillation column 31 including evaporator 31a and condenser 31b, a second distillation column 32 including evaporator 32a and condenser 32b, means 33 of supplying a boron-containing chlorosilane mixture, means 34 of removing a boron-depleted bottom stream of tetrachlorosilane, means 35 of transferring a top stream of low boilers from the first distillation column 31 to the second distillation column 32, means 36 of removing a boron-depleted bottom stream of trichlorosilane from the second distillation column 32, means 42 of removing a boron-depleted side stream of trichlorosilane from the first distillation column 31, means 37 of removing a boron-depleted top stream of low boilers, from which inert gases 38 and a dichlorosilane fraction 39 are removed, and means 40 of removing a boron-enriched side stream from the second distillation column 32, the branched-off side stream 47 serving for boron discharge. In addition, FIG. 3 shows means 41 for removing the combined dichlorosilane streams 39 and trichlorosilane streams 36 and 42.

Table 3 shows, with reference to a specific example, the proportions by mass of the individual components in the particular substreams in the arrangement according to example 3 and reports the particular mass flows:

| Proportion | Mass flow in line | | | | | |
|---|---|---|---|---|---|---|
| by mass | 33 | 42 | 36 | 39 | 40 | 41 |
| DCS | 0.001 | 0.001 | 0 | 1 | 0.822 | 0.005 |
| $BCl_3$ in ppm | 1 | 1 | 5 | 62 | 5800 | 1 |
| TCS | 0.177 | 0.999 | 1 | 0 | 0.172 | 0.995 |
| $SiCl_4$ | 0.819 | 0 | 0 | 0 | 0 | 0 |
| Others | 0.004 | 0 | 0 | 0 | 0 | 0 |
| Mass flow kg/h | | | | | | |

Example 4

TCS Preparation as a Side Stream, DCS Recovery Via the Top Stream and Discharge of Boron in the Side Stream FIG. 4 shows an alternative embodiment of an inventive distillation apparatus comprising a distillation column 51 including evaporator 51a and condenser 51b, means 53 of supplying a boron-containing chlorosilane mixture, means 54 of removing a boron-depleted bottom stream of tetrachlorosilane, means 56 of removing a boron-depleted side stream of trichlorosilane, means 57 of removing a boron-depleted top stream of low boilers, from which inert gases 58 and a dichlorosilane fraction 59 are removed, and means of removing a boron-enriched side stream from the distillation column 51, the branched-off side stream 60 serving for boron discharge. In addition, FIG. 4 shows means 61 of removing the combined dichlorosilane stream 59 and trichlorosilane stream 56.

Table 4 shows, with reference to a specific example, the proportions by mass of the individual components in the particular substreams in the arrangement according to example 4 and reports the particular mass flows:

| | Mass flow in line | | | |
|---|---|---|---|---|
| Proportion by mass | 53 | 56 | 59 | 60 |
| DCS | 0.001 | 0.001 | 0.999 | 0.958 |
| $BCl_3$ in ppm | 1 | 1 | 530 | 1500 |
| TCS | 0.177 | 0.999 | 0 | 0.04 |
| $SiCl_4$ | 0.819 | 0 | 0 | 0 |
| Others | 0.004 | 0 | 0 | 0 |
| Mass flow kg/h | 50 000 | 8815 | 35 | 13 |

Example 5

TCS Preparation in the Side Stream and Discharge of Boron Via the Top Stream without DCS Recovery FIG. 5 shows a further alternative embodiment of an inventive distillation arrangement comprising a distillation column 71 including evaporator 71a and condenser 71b, means 73 of supplying a boron-containing chlorosilane mixture, means 74 of removing a boron-depleted bottom stream of tetrachlorosilane, means 76 of removing a boron-depleted side stream of trichlorosilane, means 77 of removing a boron-enriched top stream of low boilers, from which inert gases 78 and a boron-enriched silane fraction 79 are removed, this silane stream 79 serving for boron discharge.

The invention claimed is:

1. A process for recovering boron-depleted chlorosilanes from a boron-containing chlorosilane mixture, comprising distillatively removing a boron-enriched distillation stream from the boron-containing chlorosilane mixture, wherein, in an arrangement of one or more distillation columns, a boron-enriched side stream is branched off in at least one of said distillation columns, and is disposed of or sent to another use, wherein the boron-enriched distillation stream comprises at least 20%, of the amount of $BCl_3$ present in a distillation input feed and the boron-containing chlorosilane mixture comprises 0.1 to 20 ppm by weight of $BCl_3$.

2. The process according to claim 1, wherein a boron-depleted bottom stream of tetrachlorosilane is branched off in the distillation column or in the lowermost distillation column, and is sent to further workup or to another use.

3. The process according to claim 1, wherein a side stream or a bottom stream of boron-depleted trichlorosilane is branched off in at least one of said distillation columns, and is sent to further workup or to another use.

4. The process according to claim 3, wherein, in the case of a plurality of distillation columns, a bottom stream of boron-depleted trichlorosilane is branched off in one of these distillation columns which is not the lowermost.

5. The process according to claim 3, wherein, in the case of a plurality of distillation columns, a side stream is branched off in one of said distillation columns, and a bottom stream of boron-depleted trichlorosilane is branched off in a further distillation column above the aforementioned distillation column, wherein the two boron-depleted trichlorosilane streams are optionally combined.

6. The process according to claim 1, wherein a top stream of boron-depleted dichlorosilane is branched off in the distillation column or, in at least one of a plurality of distillation columns which is not the lowermost and optionally combined with the boron-depleted trichlorosilane stream(s) or sent to another use.

7. The process according to claim 6, wherein inert gases are removed from the top stream of the distillation column or of the uppermost distillation column.

8. The process according to claim 1, wherein the distillation is performed at an absolute pressure in the range between 0.5 and 22 bar, and the particular pressures are optionally independent of one another in a plurality of distillation columns.

9. The process according to claim 1, wherein the boron-containing chlorosilane mixture comprises 2 to 98% by weight, of tetrachlorosilane; 1 to 97% by weight, of trichlorosilane; 0.01 to 20% by weight, of dichlorosilane; and 0.1 to 20 ppm by weight of $BCl_3$.

10. The process according to claim 1, wherein the boron-depleted side stream or bottom stream or the boron-depleted side streams and bottom streams of trichlorosilane comprise more than 90% by weight of trichlorosilane, the proportion of $BCl_3$ being lower than the proportion in the distillation input feed.

11. The process according to claim 1, wherein a boron-depleted top stream comprises low boilers, inert gases and not more than 60%, of the amount of $BCl_3$ present in the distillation input feed.

12. The process according to claim 7, wherein the proportion of $BCl_3$ in the combined boron-depleted stream of trichlorosilane and dichlorosilane is lower than the proportion in the distillation input feed.

13. The process according to claim 1, wherein the distillation is performed at a pressure in the range between 1 and 10 bar, and the particular pressures are independent of one another in a plurality of distillation columns.

14. The process according to claim 1, wherein the boron-containing chlorosilane mixture comprises 4 to 95% by weight of tetrachlorosilane; 5 to 50% by weight of trichlorosilane; 0.05 to 5% by weight of dichlorosilane; and 0.5 to 5 ppm by weight of $BCl_3$.

15. The process according to claim 1, wherein the distillation is carried out at a temperature of from 20° C. to 140° C.

16. The process according to claim 1, wherein the distillation is carried out at a pressure of from 1.5 to 5 bar.

17. A process for recovering boron-depleted trichlorosilane from a boron-containing chlorosilane mixture, comprising distillatively removing a boron-enriched distillation stream from the boron-containing chlorosilane mixture, wherein, in an arrangement of only one distillation column, a boron-depleted side stream of trichlorosilane is branched off and is sent to further workup or to another use, and a boron-enriched top stream or side stream is branched off and is disposed of or sent to another use.

18. The process according to claim 17, wherein the boron-enriched distillation stream comprises at least 20%, of the amount of $BCl_3$ present in a distillation input feed and the boron-containing chlorosilane mixture comprises 0.1 to 20 ppm by weight of $BCl_3$.

19. An apparatus for recovering boron-depleted chlorosilanes from a boron-containing chlorosilane mixture, comprising:
   a) one or more distillation columns suitable for distillation of boron-containing chlorosilane mixtures,
   b) means of supplying a boron-containing chlorosilane mixture, said means being arranged on the distillation column or on the lowermost distillation column and optionally being suitable for supplying a mass flow of 1000 to 800 000 kg/h,
   c) means of removing a boron-depleted bottom stream of tetrachlorosilane, said means being arranged on the distillation column or on the lowermost distillation column and optionally being suitable for removing a mass flow of 500 to 750 000 kg/h,
   d) means of removing a boron-depleted side stream or bottom stream of trichlorosilane, said means being arranged on at least one of the distillation columns and optionally being suitable for removing a mass flow of 1000 to 50 000 kg/h,
   e) means of removing a boron-depleted top stream of low boilers, principally dichlorosilane, said means being arranged on at least one of these distillation columns which is not the lowermost and optionally being suitable for removing a mass flow of 10 to 1000 kg/h,
   f) means of removing inert gases from the top stream of the distillation column or, in the case of a plurality of distillation columns, from the uppermost distillation column, and
   g) optionally, means of combining the boron-depleted low boilers, principally dichlorosilane, from the top stream with the boron-depleted trichlorosilane stream(s) removed beforehand, and means of removing the combined chlorosilane streams, the latter optionally being suitable for removing a mass flow of 1000 to 50 000 kg/h,
   wherein a means of removing a boron-enriched side stream is arranged at least in one of the distillation columns and the means is optionally suitable for removing a mass flow of 1 to 100 kg/h.

20. The apparatus for recovering boron-depleted chlorosilanes from a boron-containing chlorosilane mixture according to claim 19, comprising:
   a) one or more distillation columns suitable for distillation of boron-containing chlorosilane mixtures,
   b) means of supplying a boron-containing chlorosilane mixture, said means being arranged on the distillation column or on the lowermost distillation column and being suitable for supplying a mass flow of 1000 to 800 000 kg/h,
   c) means of removing a boron-depleted bottom stream of tetrachlorosilane, said means being arranged on the distillation column or on the lowermost distillation column and being suitable for removing a mass flow of 500 to 750 000 kg/h,
   d) means of removing a boron-depleted side stream or bottom stream of trichlorosilane, said means being arranged on at least one of the distillation columns and being suitable for removing a mass flow of 1000 to 50 000 kg/h,
   e) means of removing a boron-depleted top stream of low boilers, principally dichlorosilane, said means being arranged on at least one of these distillation columns which is not the lowermost and being suitable for removing a mass flow of 10 to 1000 kg/h,
   f) means of removing inert gases from the top stream of the distillation column or, in the case of a plurality of distillation columns, from the uppermost distillation column, and
   g) optionally, means of combining the boron-depleted low boilers, principally dichlorosilane, from the top stream with the boron-depleted trichlorosilane stream(s) removed beforehand, and means of removing the combined chlorosilane streams, the latter being suitable for removing a mass flow of 1000 to 50 000 kg/h,
   wherein a means of removing a boron-enriched side stream is arranged at least in one of the distillation columns and the means is suitable for removing a mass flow of 1 to 100 kg/h.

21. An apparatus for recovering boron-depleted chlorosilanes from a boron-containing chlorosilane mixture, comprising:
   a) a distillation column suitable for distilling boron-containing chlorosilane mixtures,
   b) means, arranged on the distillation column, of supplying a boron-containing chlorosilane mixture, said means optionally being suitable for supplying a mass flow of 1000 to 800 000 kg/h,
   c) means, arranged on the distillation column, of removing a boron-depleted bottom stream of tetrachlorosilane, said means optionally being suitable for removing a mass flow of 500 to 750 000 kg/h,
   d) means, arranged on the distillation column, of removing a boron-depleted side stream of trichlorosilane, said means optionally being suitable for removing a mass flow of 1000 to 50 000 kg/h, and
   e) means of removing inert gases from the top stream of the distillation column,
   wherein, for the removal of boron, means of removing a boron-enriched top stream or side stream are arranged on the distillation column and the means is optionally suitable for removing a mass flow of 1 to 100 kg/h.

* * * * *